(12) United States Patent
Hui et al.

(10) Patent No.: US 6,590,932 B1
(45) Date of Patent: Jul. 8, 2003

(54) METHODS, RECEIVER DEVICES AND SYSTEMS FOR WHITENING A SIGNAL DISTURBANCE IN A COMMUNICATION SIGNAL

(75) Inventors: Dennis Hui, Cary, NC (US); Kambiz C. Zangi, Durham, NC (US); Rajaram Ramesh, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/450,684

(22) Filed: Nov. 24, 1999

(51) Int. Cl.[7] .............................................. H03H 17/04
(52) U.S. Cl. ...................... 375/232; 375/284; 375/285; 375/348; 375/350; 708/322; 329/320; 329/353
(58) Field of Search ................................ 375/229, 230, 375/231, 232, 262, 265, 284, 285, 341, 346, 348, 350; 708/322, 323; 329/318, 320, 349, 353

(56) References Cited

U.S. PATENT DOCUMENTS

| | | | |
|---|---|---|---|
| 5,031,195 A | | 7/1991 | Chevillat et al. ............. 375/14 |
| 5,293,401 A | * | 3/1994 | Serfaty ........................ 375/231 |
| 5,572,552 A | * | 11/1996 | Dent et al. .................. 375/324 |
| 5,721,694 A | * | 2/1998 | Graupe ........................ 702/191 |
| 5,751,768 A | * | 5/1998 | Guglielmi et al. .......... 375/232 |
| 5,905,743 A | | 5/1999 | Ramesh ..................... 375/43.7 |
| 6,134,265 A | * | 10/2000 | Long ........................... 375/222 |
| 6,226,321 B1 | * | 5/2001 | Michels et al. ............. 375/227 |
| 6,307,883 B1 | * | 10/2001 | Kanada et al. .............. 370/292 |
| 6,314,147 B1 | * | 11/2001 | Liang et al. ................. 375/346 |

FOREIGN PATENT DOCUMENTS

| | | |
|---|---|---|
| DE | 19803235 | 7/1999 |
| EP | 0 615 347 A1 | 9/1994 |

OTHER PUBLICATIONS

Bernad Sklar, Digital Communications Fundamentals And Applications, pp. 105–106.*

Copy of International Search Report for PCT/US00/26776.
G. David Forney, *Maximum–Likelihood Sequence Estimation of Digital Sequences in the Presence of Intersymbol Interference*, IEEE Transactions on Information Theory, vol. IT–18, No. 3, May 1972.
John G. Proakis, Excerpts of *Digital Communications*, 1989.
Gottried Ungerboeck, *Adaptive Maximum–Likelihood Receiver for Carrier–Modulated Data–Transmission Systems*, IEEE Transactions on Communications, vol. COM–22, No. 5, May 1974.
Torsten Söderström, *Convergence Properties of the Generalised Least Squares Identification Method*, 3rd IFAC symposium on Identification and System Parameter Estimation, Hague/Delft, The Netherlands, Jun. 1973.
Lennart Ljung, *System Identification: Theory for the User*, pp. 288–300.
Lin et al., *Optimal Tracking of Time–Varying Channels: A Frequency Domain Approach for Known and New Algorithms*, IEEE Transactions on Selected Areas in Communications, vol. 13, No. 1, Jan., 1995.

* cited by examiner

Primary Examiner—Stephen Chin
Assistant Examiner—Dac V. Ha
(74) Attorney, Agent, or Firm—Myers Bigel Sibley & Sajovec

(57) ABSTRACT

Methods, systems and receiver devices are provided which may reduce the average power of a signal disturbance by whitening the signal disturbance. In one aspect, a finite impulse response filter (FIR) is provided which whitens the signal disturbance by filtering a downsampled received signal using filter coefficients adaptively established using known signal information in each signal burst of the received signal. Alternatively, a noise-whitening equalizer is utilized having a modified metric that whitens the signal disturbance again using coefficients adaptively established using known signal information in each signal burst of the received signal. The noise-whitening equalizer approach further allows the noise-whitening coefficients to be updated by treating symbol estimates from the equalizer as known signal information to generate updated noise-whitening coefficients. A novel receiver containing a modified Euclidean metric equalizer to provide noise-whitening is also provided.

54 Claims, 3 Drawing Sheets

METHODS, RECEIVER DEVICES AND SYSTEMS FOR WHITENING A SIGNAL DISTURBANCE IN A COMMUNICATION SIGNAL

BACKGROUND OF THE INVENTION

The present invention relates to communications methods and apparatus, and more particularly, to methods and apparatus for receiving communications signals subject to noise such as those typically found in wireless communication systems. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Wireless communications systems such as cellular radiotelephone systems typically include a plurality of communication channels which may be established between a first transceiver (such as a base station) and a second transceiver (such as a mobile terminal). The communication channels typically are subject to performance-degrading environmental effects such as multi-path fading and interference (noise). Fading effects include flat fading which may arise from the interaction of a transmitted signal (the main ray) with reflected versions of the transmitted signal that arrive concurrently at a receiver. Time dispersion, another type of fading, may arise from interaction of the main ray with time-delayed reflections of the main ray. Interference effects may be caused by interaction of non-orthogonal signals generated in the signal medium by sources other than the source of the desired transmitted signal. These various sources of signal disturbances may come from a variety of sources including thermal noise, a co-channel interferer and an adjacent-channel interferer. Most cellular communication standards typically require the receiver to achieve a minimum adjacent-channel protection (ACP). Unfortunately, to meet this minimum specification, a narrow receive filter is often used in the receiver at the expense of losing co-channel performance which might otherwise be obtainable with a wider receive filter.

The dynamic characteristics of the radio channel present difficulties in tracking the channel to allow for decoding of information contained in the received signal. Often, in wireless mobile radio systems, known data sequences are inserted periodically into the transmitted information sequences. Such data sequences are commonly called synchronizing sequences or training sequences and are typically provided at the beginning or in the middle of a frame of data or a burst of data. Channel estimation may be carried out using the synchronizing sequences and other known parameters to estimate the impact the channel has on the transmitted signal. Least square estimation may be an efficient way of estimating the channel impulse response in the presence of additive Gaussian (white) noise. However, as the noise becomes non-white, or colored, these techniques may become less effective.

To extract the transmitted signal (or symbols) from the received signal, the receiver of a mobile terminal typically includes a demodulator which may be a coherent demodulator such as a maximum likelihood sequence estimation (MLSE) demodulator (or equalizer). To adapt to the channel variation over each data burst, an associated channel tracker is typically provided for the demodulator. The channel tracker typically operates in a "decision directed" mode where the symbol estimates are used to track the variations of the channel. After acquisition of a communicated signal by the receiver, the channel tracker maintains a channel estimate to provide a coherent reference between the demodulator and the received signal. The most commonly used channel tracking methods are the Least Mean Square (LMS) and Recursive Least Square (RLS) based algorithms. See for example, "Optimal Tracking of Time-varying Channels: A Frequency Domain Approach for known and new algorithms," *IEEE Transactions on Selected Areas in Communications*, Vol. 13, NO. 1, January 1995, Jingdong Lin, John G. Proakis, Fuyun Ling.

At any given time, the kind of disturbances (co-channel interferences, adjacent-channel interference, or thermal noise) that dominates in the received signal is generally unknown. The typical approach is to design the demodulator or the equalizer in the receiver assuming the dominant disturbance is white (i.e. uncorrelated in time), hoping that it will suffice well even when the disturbance is somewhat colored.

For example, consider the receiver model depicted in FIG. 1. A signal y(t) is first filtered in an analog filter 105 having a transfer function h(t) to provide a received signal r(t) which is downsampled to a symbol rate received signal r(n) before processing in the equalizer 110 to get a signal estimate $S_{est}(u)$. As used herein, the term "symbol rate" encompasses both the symbol transmission rate and multiples thereof. The symbol-rate downsampled discrete-time received signal r(n) is given by:

$$r(n) = \sum_{i=0}^{L-1} c(i)s(n-i) + w(n), \qquad (1)$$

where c(i) is the discrete-time based-band channel model with L coefficients, s is the transmitted symbols, and w(n) is a discrete-time random process caused by the signal disturbance (this sequence can be either colored or white and may be referred to as noise).

At a time "n", each state in the trellis of a maximum likelihood sequence estimation (MLSE) equalizer can be expressed as $S_n = [s(n), s(n-1), \ldots, s(n-L+2)]$. At each state of the trellis, a surviving path and a cumulative path metric $M(S_n)$ are kept for each of the $8^{L-1}$ states. Also, at each stage of the trellis, the branch metric is:

$$dM(S_n, S_{n-1}) = \left| r(n) - \sum_{i=0}^{L-1} c(i)\hat{s}(n-1) \right|^2 \qquad (2)$$

where ŝ is the signal (symbol) estimate and $dM(S_n, S_{n-1})$ corresponding to the state transition from one previous hypothesized state, $S_{n-1}$, to the current hypothesized state, $S_n$, which is computed and added to the path metric $M(S_{n-1})$ associated with the previous state. The path metric of the current state may then be updated by choosing the minimum of the accumulated metrics among all paths that terminate in the current hypothesized state, $S_n$.

Equation (2) implicitly assumes that w(n) is a white Gaussian sequence (i.e. it assumes that the w(n)s are uncorrelated in time). However, in many practical cases where the dominant disturbance is not the thermal noise, this assumption is not valid. Even when the disturbance is just the thermal noise, w(n) may not be white if the receive filter 105 h(t) is not Nyquist. In this case, however, the autocorrelation of w(n) denoted by $\rho_{ww}(m)$, is typically fixed and can be found by:

$$\rho_{ww}(m)=E[w(n)w^*(n-m)]=N_0 \int h(t)\, h^*(t-mT) dt, \quad (3)$$

where $N_0=E[|n(t)|^2]$.

Typically, given any colored stationary sequence v(n), one can design a casual, invertible, linear and time-invariant (LTI) whitening filter with input v(n) and output z(n), where z(n) is white. As the whitening filter is generally causal and invertible, this filter typically does not cause any loss in information. This whitening filter is closely related to the linear least-squares one-step predictor of v(n). Specifically, let $$\hat{w}(n|n-1) = \sum_{i=1}^{\infty} a(i) w(n-i) \quad (4)$$

be the linear least-squares predictor of w(n) based on {w(m) m<n}. As described in A. Papoulis, Probability, Random Variables, and Stochastic Processor, McGraw-Hill, 1984, the impulse response of the whitening filter for v(n) is:

$$h(n)=-a(n) \text{ for } n \geq 1 \quad (5)$$

and h(n)=1 for n=0 and h(n)=0 for n<0. Furthermore:

$$z(n) = w(n) * h(n) \quad (6)$$
$$= w(n) - \hat{w}(n|n-1). \quad (7)$$

Using the orthogonality principle of linear estimation, it may be shown that z(n) in equation (7) is a white (i.e. uncorrelated) sequence; hence, h(n) is the desired whitening filter. Using recursion, it is also possible to show that h(n) is casually invertible; hence, h(n) is minimum-phase.

This approach to whitening the disturbances is suggested in David Forney, "Maximum-Likelihood Sequence Estimation of Digital Sequences in the Presence of Intersymbol Interference," Info. Theory, 1972. The Forney article discusses undoing the effect of noise coloring caused by the matched filter by adding a digital noise whitening filter between the sampler and the equalizer (an MLSE equalizer with a Euclidean metric). The desired impulse response of the whitening filter can be computed using the autocorrelation function of $$w(n) \text{(i.e. } \rho_{ww}(m)=E\{w(n)w^*(n-m)\}\text{)}.$$

The above approach may work when the input signal disturbance is white (for example, thermal noise), as, in this case, $\rho_{ww}(m)=E\{w(n)\, w^*(n-m)\}$ is typically fixed and known from equation (3) for each lag m. However, when the disturbance is dominated by co-channel or adjacent-channel interference, it is believed that the autocorrelation of w(n) would need to be estimated for all lags in order to compute {a(i)} properly. In addition, the effective baseband channel seen by the equalizer will generally consist of the convolution of the whitening filter and the original channel go Therefore, the equalizer may have to equalize a much longer channel, possibly requiring a more complex equalizer.

SUMMARY OF THE INVENTION

According to the present invention, methods, systems and receiver devices are provide which may reduce the average power of a signal disturbance by whitening the signal disturbance. In one aspect, a finite impulse response filter (FIR) is provided which whitens the signal disturbance by filtering a downsampled received signal using filter coefficients adaptively established using known signal information in each signal burst of the received signal. Alternatively, a noise-whitening equalizer is utilized having a modified metric that whitens the signal disturbance again using coefficients adaptively established using known signal information in each signal burst of the received signal. The noise-whitening equalizer approach further allows the noise-whitening coefficients to be updated by treating symbol estimates from the equalizer as known signal information to generate updated noise-whitening coefficients. A novel receiver containing a modified Euclidean metric equalizer to provide noise-whitening is also provided.

In one embodiment of the present invention, a method is provided for adaptively whitening a signal disturbance in a communication signal the communication signal, which includes the signal disturbance, is received and coefficients are determined for whitening the signal disturbance using known signal information from the received signal. An estimate of the transmitted signal (or symbols), referred to herein as a "signal estimate" of a "symbol estimate", is generated for the received signal using the determined coefficients. The communication signal may include a plurality of signal bursts containing the known signal information which are received. The steps of receiving, determining and generating are repeated for at least two of the plurality of signal bursts. Accordingly, the determined coefficients are updated for each burst and then used by the equalizer in generating the signal estimates for the received burst which was used to determine (update) the coefficients.

In a further embodiment of the present invention, the signal estimate is generating by processing the received signal through a whitening filter having a selected number of taps associated with the determined coefficients and processing the filtered received signal through an equalizer to generate a signal estimate for the received signal. The communication signal is preferably downsampled to a symbol rate of the communication signal before filtering. In one embodiment, the received signal is processed through a whitening filter having M+1 taps, where M is a selected integer, and wherein the determined coefficients are coefficients of the whitening filter which are based on an M-th order linear predictor of the signal disturbance. The coefficients of the whitening filter may be determined over a training sequence in the received signal.

In another embodiment of the present invention, the coefficients for whitening the signal disturbance are determined by first determining a plurality of channel taps of the equalizer and determining the signal disturbance based on the determined channel taps and samples of the received signal. An auto-correlation of the signal disturbance is determined for a plurality of lags and the coefficients of the whitening filter are established based on the determined auto-correlation of the signal disturbance. The whitening filter may be a minimum-phase filter. The whitening filter may also be monic with simple scaling. The equalizer may use a Euclidean metric.

In further embodiment of the present invention, the signal estimate for the received signal is generated by processing the received signal through a noise-whitening equalizer to generate a signal estimate for the received signal. Metrics of the noise-whitening equalizer are modified to convert the signal disturbance to a substantially white noise signal disturbance. An estimate of the signal disturbance may be maintained for a plurality of states in a decoding trellis of the noise-whitening equalizer.

In yet another embodiment of the present invention, the coefficients for whitening the signal disturbance are determined by first determining a plurality of channel taps of the noise-whitening equalizer and determining the signal disturbance based on the determined channel taps and samples of the received signal. An auto-correlation of the signal disturbance is determined for a plurality of lags to provide a model for the color of the signal disturbance. The received signal is processed through a noise-whitening equalizer having a coefficients determined based on the model for the color of the signal disturbance to generate a signal estimate for the received signal. The noise-whitening equalizer may be an Ungerboeck maximum likelihood sequence estimation (MLSE) equalizer.

In a further embodiment of the present invention, the determined coefficients are updated based on the signal estimate from the noise-whitening equalizer. The update may be provided by treating the signal estimate from the noise-whitening equalizer as known signal information.

In further aspect of the present invention, a method for whitening a signal disturbance in a received signal is provided. The received signal, wherein r(n) is the received signal at an nth symbol period, is processed through a modified Euclidean metric equalizer using metrics defined by the equation $$dM = \left| r(n) - \sum_{i=0}^{L-1} c(i)\hat{s}(n-i) - \hat{w}(n|n-1) \right|^2$$

where c(i) is a channel estimate, $\hat{s}$ (n−i) is a symbol estimate, L is a number of coefficients in the channel estimate (or model), and $\hat{w}$(n|n−1) is a one-step ahead predictor of the signal disturbance at the nth symbol which is based on estimated characteristics of the signal disturbance to generate a signal estimate for the received signal.

In an apparatus aspect of the present invention, a receiver device is provided including a receiver that receives wireless communication signals including a signal disturbance and downsamples the received signals to a symbol rate of the communication signals to provide received signal samples. The receiver device also includes a noise-whitening filter that filters the received signal samples, the noise-whitening filter having filter coefficients. An equalizer generates symbol estimates from the filtered received signal samples. The receiver device also includes a filter coefficient estimation circuit that generates the filter coefficients based on known signal information from the received signals.

In a further embodiment of the present invention, a receiver device is provided including a receiver that receives wireless communication signals including a signal disturbance and downsamples the received signals to a symbol rate of the communication signals to provide received signal samples. The receiver device further includes a noise-whitening equalizer having an associated metric that generates a signal estimate for the received signal and a metric circuit that adjusts the metric based on known signal information from the received signals. The metric circuit preferably outputs a model of the signal disturbance to the noise-whitening equalizer and the associated metric is based on the model of the signal disturbance.

In yet another embodiment of the present invention, a receiver device is provided including a receiver that receives wireless communication signals including a signal disturbance and downsamples the received signals to a symbol rate of the communication signals to provide received signal samples, where r(n) is a received signal sample at an nth symbol period. The receiver device further includes a modified Euclidean metric equalizer using metrics defined by the equation $$dM = \left| r(n) - \sum_{i=0}^{L-1} c(i)\hat{s}(n-i) - \hat{w}(n|n-1) \right|^2$$

where c(i) is a channel estimate, $\hat{s}$ (n−i) is a symbol estimate, L is a number of coefficients in the channel estimate (or model), and $\hat{w}$(n|n−1) is a one-step ahead predictor of the signal disturbance at the nth symbol which is based on estimated characteristics of the signal disturbance to generate a signal estimate for the received signal.

As will further be appreciated by those of skill in the art, while described above primarily with reference to method aspects, the present invention may also be embodied as systems.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by those of skill in the art, the present invention may be embodied as methods or devices. Accordingly, the present invention may take the form of a hardware embodiment, a software embodiment or an embodiment combining software and hardware aspects.

Figure 1:
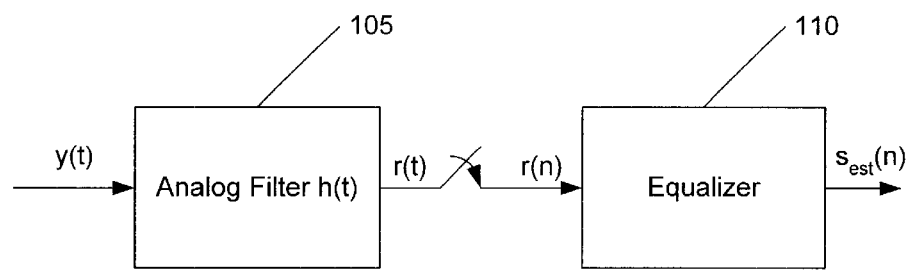
FIG. 1 is a schematic block diagram illustrating a conventional receiver.
Figure 2:
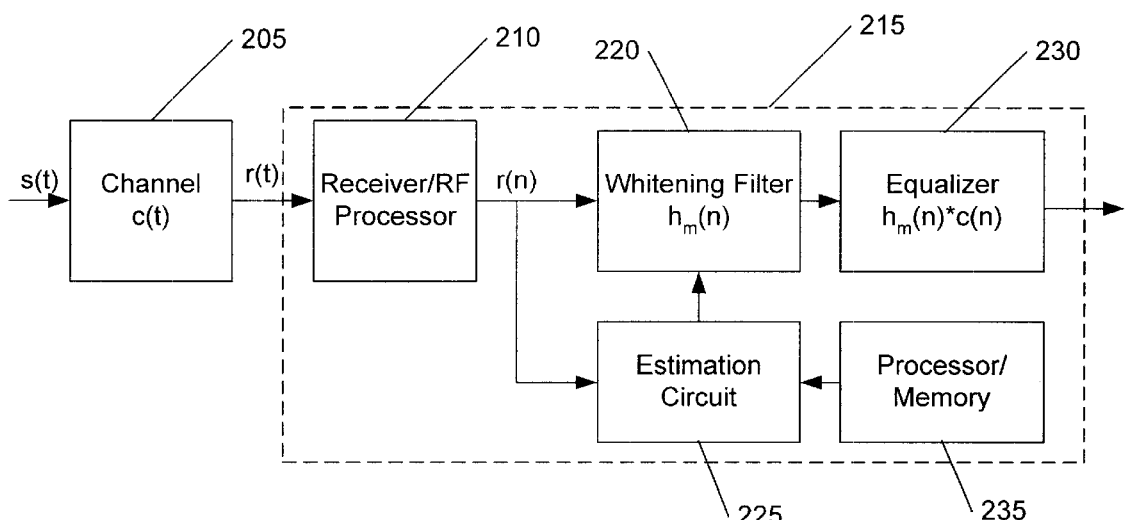
FIG. 2 is a schematic block diagram illustrating a receiver device according to a first embodiment of the present invention.

The present invention will now be further described with reference to the block diagram illustration of an embodiment of the present invention in FIG. 2. As shown in FIG. 2, a signal s(t) is transmitted over a channel 205 having a channel characteristic c(t), such as a wireless cellular radio telephone communication channel. The transmitted signal including channel induced effects is received as a signal r(t) at the receiver/RF processor 210 which provides a front end receiver for a receiver device 215 according to an embodiment of the present invention. The receiver 210 receives the wireless communication signals r(t) which include a signal disturbance, such as an interference signal from an adjacent-channel interferer or a co-channel interferer. The receiver 210 further downsamples the received signals to a symbol rate of the communication signals to provide a received signal r(n).

The receiver device 215 further includes a whitening filter 220 that filters the received signal r(n) samples. The noise whitening filter 220 has an associated impulse response $h_m(n)$ having an associated matrix of filter coefficients. A filter coefficient estimation circuit 225 generates the filter coefficients for the whitening filter 220 based on known signal information from the received signals. Accordingly, the received signal samples r(n) are provided by the receiver 210 to both the whitening filter 220 and the estimation circuit 225.

The estimation circuit 225 in the illustrated embodiment of FIG. 2 obtains the known signal information from a control processor/memory 235 of the receiver device 215. For example, the processor/memory 235 may have knowledge of the defined bit pattern for a training sequence included in signal burst for signals received over the channel 205 as defined by the communication protocol used for the communication signals. The equalizer 230 generates symbol estimates from the filtered received signal samples output by the whitening filter 220.

The whitening filter 220 may have a selected finite number of taps with each tap being associated with one of the filter coefficients provided by the estimation circuit 225. For example, the whitening filter 220 may have M+1 taps where M is a selected finite integer and wherein the filter coefficients are based on an M-th order linear predictor of the signaled disturbance. In addition, the number of taps M can also be provided by the estimation circuit. For example, the number of coefficients M may be gradually increased. If the incremental reduction in interference (noise) power is larger than a determined criteria, then M may be increased, for example, by one. This adaptive process may be repeated until the incremental reduction in the power of the noise is less than a threshold criteria or until some specified maximum M is reached. The whitening filter 220 may also be a minimum phase filter such as a monic with simple scaling. The equalizer 230 may be an equalizer which uses a Euclidean metric.

The whitening filter 220 is preferably designed with a constraint on the number of taps (i.e. a finite impulse response). Specifically, an (M+1)-tap whitening filter for w(n), may be provided as:

$$h_M(n) = -a_M(n) \text{ for } 1 \leq n \leq M \quad (8)$$

where $h_M(n)=1$ for n=0 and $h_M(n)=0$ for n>M and for n<0 and where $a_M(k)$s are the coefficients of the M-th order one-step ahead linear predictor of w(n) based on {w(m): m−M≦m<n}, i.e.:

$$\hat{w}(n|n-1) = \sum_{i=1}^{M} a_M(i)w(n-i) \quad (9)$$

Note that the coefficients $\{a_M(k)\}_{k=1}^{M}$ are different from the first M taps of $\{a(k)\}$s. However, $\{a_M(k)\}_{k=1}^{M}$ can also be obtained from the auto-correlation of w(n). More specifically, if $T_M$ is an (M×M) Hermitian Toeplitz auto-correlation matrix of w(n):

$$T_M = \begin{bmatrix} \rho_{ww}(0) & \rho_{ww}(1)^* & \rho_{ww}(2)^* & \cdots & \rho_{ww}(M-1)^* \\ \rho_{ww}(1) & & & & \\ \rho_{ww}(M-1) & \cdots & & & \rho_{ww}(0) \end{bmatrix} \quad (10)$$

and if $r = [\rho_{ww}(1), \rho_{ww}(2), \ldots, \rho_{ww}(M)]^T$, then the coefficients of the M-th order linear predictor, $a_M = (a_M(1), a_M(2), \ldots, a_M(M))^T$ can be found by solving the system of linear equations:

$$T_M a_M = r \quad (11)$$

The Levinson-Durbin algorithm can be used to solve equation (11) efficiently.

The auto-correlation of the noise, $\{\rho_{ww}(m)\}_{m=0}^{M}$ can be estimated over the training sequence of each burst of received signal according to:

$$\hat{\rho}_{ww}(m) = \frac{1}{N} \sum_{k=1}^{N-m} w(n+k)w^*(k)$$

where N denotes the number of symbols in the training sequence and * denotes the complex conjugate and where, after channel estimation, an estimate of the noise sequence w(k) can be computed correspondingly.

By limiting the number of taps in the whitening filter 220, a compromise between the effect of noise coloring and the effect of lengthening the effective channel can be reached. Moreover, fewer parameters need to be estimated as computing $\{a_M(k)\}_{k=1}^{M}$ only requires the auto-correlation of w(n) at lags (0, 1, . . . , M).

Figure 3:
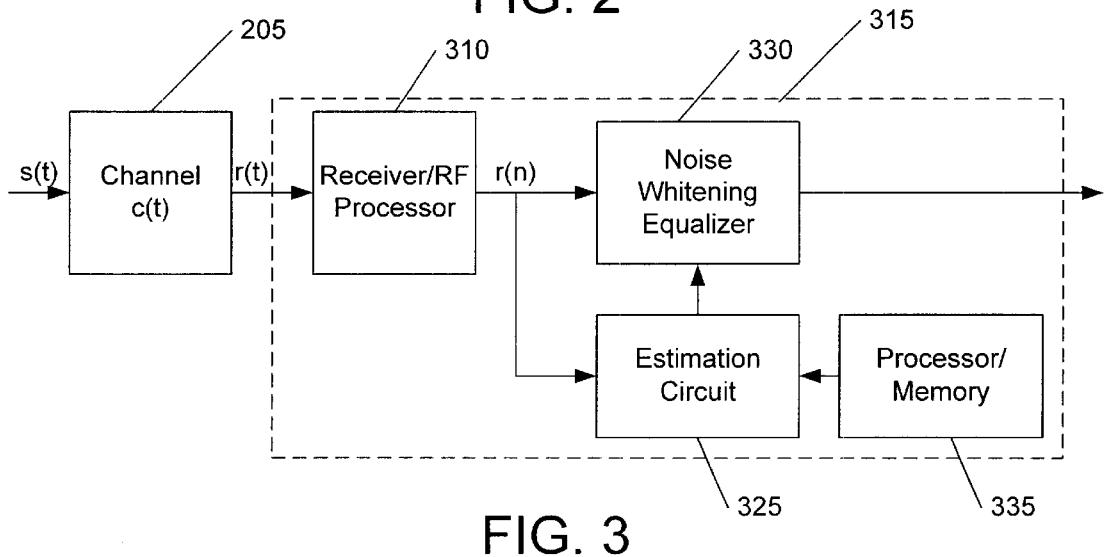
FIG. 3 is a schematic block diagram illustrating a receiver device according to a second embodiment of the present invention.

Referring know to the schematic block diagram illustration of FIG. 3, a further embodiment of a receiver device 315 for adaptively whitening a signal disturbance which may reduce the average power of a signal disturbance in a communication signal according to the present invention will now be described. As shown in the embodiment of FIG. 3, the wireless communication signal s(t) is transmitted over a channel 205 having a channel characteristic c(t) to the receiver device 315 and is received by a receiver/RF processor 310 as a received signal r(t). The receiver 310 down samples the received signal r(t) to a symbol rate of the communication signal to provide the received signal samples r(n). The receiver device 315 further includes a noise whitening equalizer 330 which has an associated metric that generates a signal estimate for the received signal.

The metric estimation circuit 325 adjusts the metric of the noise whitening equalizer 330 based on known signal information from the received signals r(n). As with the embodiment described in FIG. 2, the known signal information may be provided to the estimation circuit 325 by a processor/memory 335. For example, a training sequence of known bits included in a signal burst as defined by the protocol used for the communication signal s(t) may be known by a processor or stored in a memory of the receiver device 315.

The metric estimation circuit 325 outputs a model of the signal disturbance to the noise whitening equalizer 330 which is used by the associated metric of the noise whitening equalizer 330. It is further to be understood that the equalizers 230, 330 may, in part, support operations of the respective estimation circuits 225, 325 as well as providing signal estimates.

In the embodiment of FIG. 3, the whitening filter $h_M(n)$ may be effectively incorporated into the metric calculation of the MLSE for the noise-whitening equalizer 330. The noise-whitening equalizer 330 may, for example, be an Ungerboeck MLSE equalizer or the noise-whitening equalizer with a modified metric as described below. For ease of explanation of this embodiment, initially assume that at time "n", the past samples of the noise sequence are known exactly (i.e. assume that at time n we know $\{w(m)\}_{m=0}^{n-1}$). Furthermore, assume that the M-th order one-step ahead predictor for w(n) has coefficients a(k)s which are again known. In a preferred embodiment, the Euclidean metric (2) is modified as follows:

$$dM(S_{n-1}, S_n) = \left| r(n) - \sum_{i=0}^{L-1} c(i)\hat{s}(n-i) - \hat{w}(n\,|\,n-1) \right|^2 \quad (12)$$

$$= \left| r'(n) - \sum_{i=0}^{L-1} c(i)\hat{s}(n-i) \right|^2, \quad (13)$$

where:

$$r'(n) = r(n) - \hat{w}(n|n-1) \quad (14)$$

$$= \sum_{i=0}^{L-1} c(i)s(n-i) + (w(n) - \hat{w}(n\,|\,n-1)) \quad (15)$$

$$= \sum_{i=0}^{L-1} c(i)s(n-i) + z'(n), \quad (16)$$

where $$\hat{w}(n|n-1) = \sum_{i=1}^{M} a_M(i)w(n-i), \quad (17B)$$

and z'(n) is now a white (or nearly white) sequence. From equation (16), it can be seen that the modified metric is operating on a received signal, r'(n), which contains a white noise sequence, z'(n). Therefore, the noise-whitening equalizer 330 with the modified metric may result in an improved receiver by reducing the average power of a signal disturbance.

Of course, in an actual equalizer at time n, $$\{w(m)\}_{m=0}^{n-1}$$

is generally not known; hence, w(n−i) is replaced by its estimate obtained from the path history of the previous state $S_{n-1}$. This implies that for each terminating state in the trellis, an M-point window of estimated w(n)'s given by $$\hat{w}(n-i) = r(n-1) - \sum_{j=0}^{L-1} c(j)\hat{s}(n-i-j) \quad (18)$$

is, preferably, stored. In other words, an estimate of the signal disturbance for a plurality of states in a decoding trellis of the noise-whitening equalizer 330 is maintained.

It can be shown that such a noise-whitening equalizer with modified branch metrics (13) gives similar performance when compared to an ordinary equalizer with an Euclidean metric based on a longer channel c(n)* $h_M(n)$, preceded by the noise whitening filter $h_M(n)$. Implementing an explicit whitening filter $h_M(n)$ between the sampler and the equalizer as in the embodiment of FIG. 2 may result in a lower complexity structure than the embodiment of FIG. 3 in which noise whitening is done in the metrics. However, performing noise whitening in the metrics may provide a more flexible structure where the predictor coefficients $\{a_M(i)\}$ can be adaptively updated in a symbol-by-symbol fashion during equalization by treating the symbol estimates generated by the equalizer 330 as known signal information. Furthermore, in a high-performance equalizer where a per-survivor channel tracker is employed, the predictor coefficients $\{a_M(i)\}$ may also be updated differently for different surviving paths.

As will be appreciated by those of skill in this art, the above-described aspects of the present invention in FIGS. 2 and 3 may be provided by hardware, software, or a combination of the above. For example, while various components of receiver device 315 have been illustrated in FIG. 3, in part, as discrete elements, they may, in practice, be implemented by a micro controller including input and output ports and running software code, by custom or hybrid chips, by discrete components or by a combination of the above. For example, the noise-whitening equalizer 33 and the metric estimation circuit 325 may be implemented in part as code executing on a processor.

Operations of the present invention will now be described with respect to the flowchart illustrations of FIGS. 4 and 5. It will be understood that each block of the flowchart illustrations and the block diagram illustrations of FIGS. 2 and 3, and combinations of blocks in the flowchart illustrations and the block diagram illustrations of FIGS. 2 and 3, can be implemented by computer program instructions. These program instructions may be provided to a processor to produce a machine, such that the instructions which execute on the processor create means for implementing the functions specified in the flowchart and block diagram block or blocks. The computer program instructions may be executed by a processor to cause a series of operational steps to be performed by the processor to produce a computer implemented process such that the instructions which execute on the processor provide steps for implementing the functions specified in the flowchart and block diagram block or blocks.

Accordingly blocks of the flowchart illustrations and the block diagrams support combinations of means for performing the specified functions, combinations of steps for performing the specified functions and program instruction means for performing the specified functions. It will also be understood that each block of the flowchart illustrations and block diagrams, and combinations of blocks in the flowchart illustrations and block diagrams, can be implemented by special purpose hardware-based systems which perform the specified functions or steps, or combinations of special purpose hardware and computer instructions.

Figure 4:
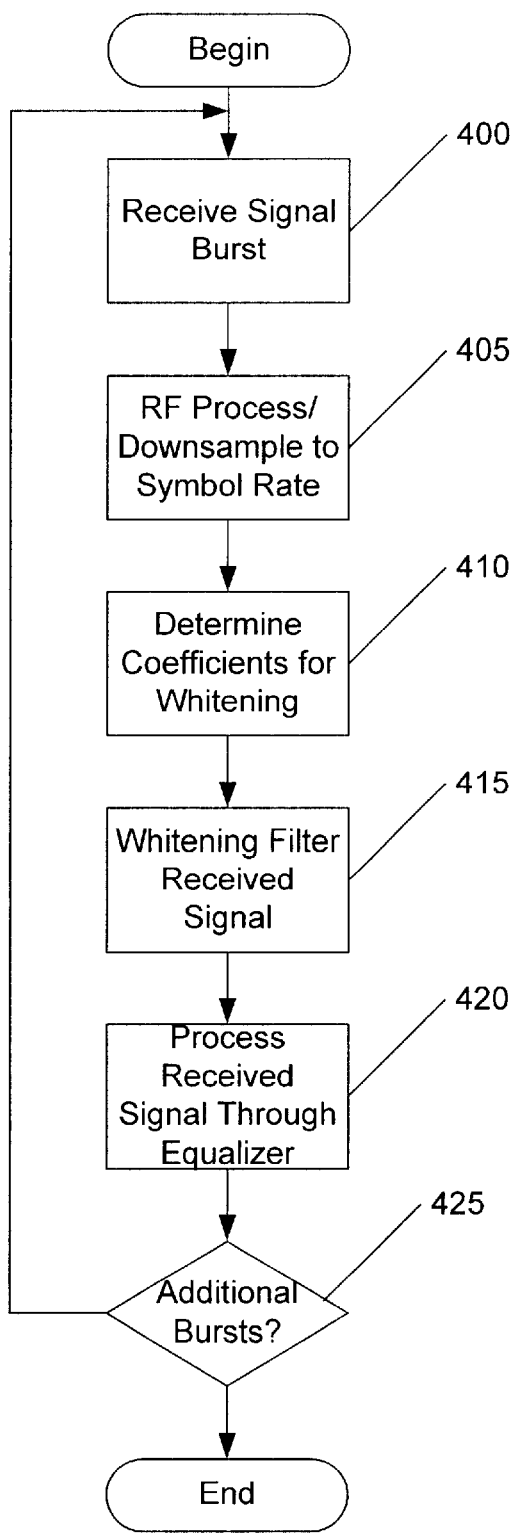
FIG. 4 is a flowchart illustrating operations for an embodiment of the present invention.
Figure 5:
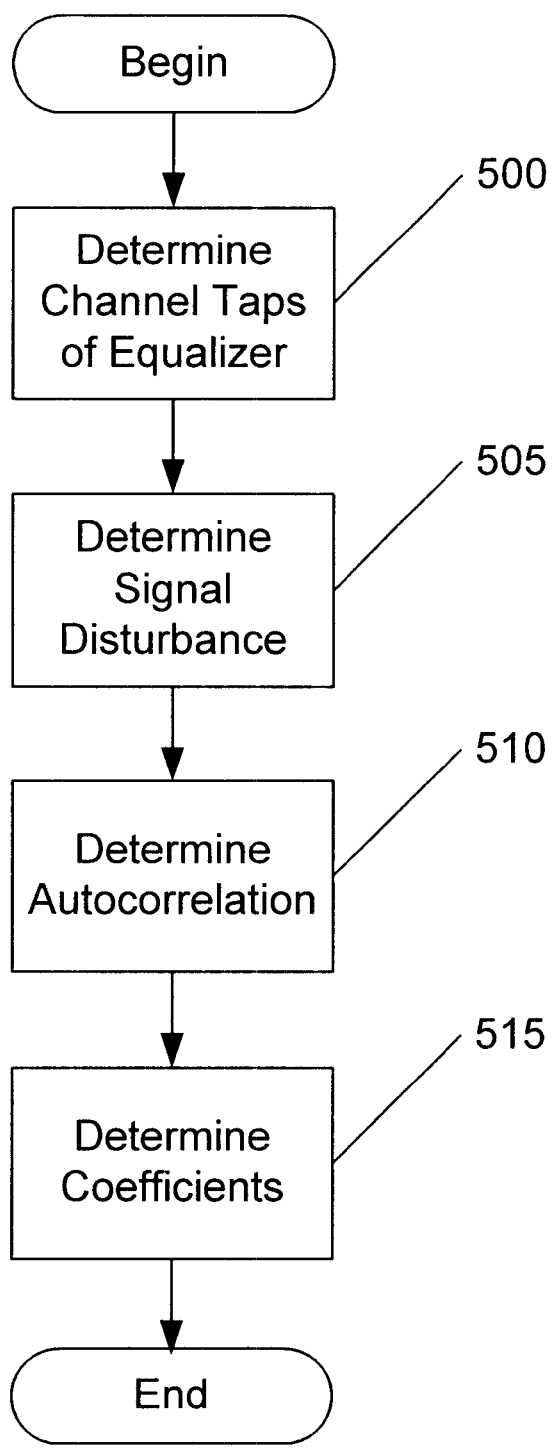
FIG. 5 is a flowchart illustrating operations for estimating coefficients according to an embodiment of the present invention.

As shown in FIG. 4, operations begin at block 400 when a communication signal including a signal disturbance is received. More particularly, the embodiment illustrated in FIG. 4 is directed to a communication system in which the communication signal includes a plurality of signal bursts containing the known signal information, such as a training sequence, within one or more of the signal bursts. In this case, operations at block 400 involve receipt of one of the plurality of signal bursts to provide a received signal. The received signal is downsampled to the symbol rate of the communication signal (block 405). Coefficients for whitening the signal disturbance are then determined using the known signal information from the received signal burst (block 410). For example, operations at block 410 may include determining the coefficients of the whitening filter 220 over a training sequence in the received signal.

In the illustrated embodiment of FIG. 4, after coefficients are determined, the received signal is processed through a whitening filter having a selected number of taps associated with the determined coefficients (block 415). The filtered received signal may then be processed through an equalizer to generate a signal estimate for the received signal (block 420). In one embodiment, the whitening filter has M+1 taps where M is a selected integer and wherein the determined coefficients are coefficients of the whitening filter which are based on an M-th order linear predictor of the signal disturbance. Alternatively, operations at block 415 may include modifying metrics of the noise whitening equalizer 330 to convert the signal disturbance to a substantially white noise signal disturbance.

Operations related to determining the coefficients for whitening the signal disturbance using known signal information from the received signal for block 410 will now be further described with reference to FIG. 5. As shown in the flow chart illustration of FIG. 5, operations begin at block 500 by determining a plurality of channel taps for the equalizer. The signal disturbance is then determined based on the determined channel taps and samples of the received signal (block 505). An auto-correlation of the signal disturbance for a plurality of lags is then determined (block 510). Finally, coefficients of the whitening filter are established based on the determined auto-correlation of the signal disturbance (block 515). The whitening filter may be a monic with simple scaling minimum phase filter and the equalizer may use a Euclidean metric.

For the receiver device 315 illustrated in the embodiment of FIG. 3, operations at block 510 may comprise determining an auto-correlation of the signal disturbance for a plurality of lags to provide a model for the color of the signal disturbance. Operations at block 515 may then comprise processing the received signal through a noise whitening equalizer having coefficients determined based on the model for the color of the signal disturbance to generate a signal estimate for the received signal. In this embodiment, the noise whitening equalizer may be an Ungerboeck maximum likelihood sequence estimation (MLSE) equalizer.

As shown in equation (1) above, the received baseband, complex-valued signal r(n) can be expressed as:

$$r(n) = \sum_{i=0}^{L-1} c(i)s(n-i) + w(n), \quad (19)$$

where c(i)s are the coefficients of the baseband channel, and w(n) is a discrete-time random process representing the disturbance signal w(n) can be any mixture of the thermal noise of the receiver, the co-channel interferer, and the adjacent-channel interferer. In a typical communication system, each transmitted burst contains a number of known symbols. Let us denote these known symbols by $$\{s(n)\}_{n=n0}^{n0+L-1}.$$

Accordingly, operations for estimating a received symbol according to various embodiments of the present invention may also be described as follows:

1. Estimate the channel taps. Call the estimated channel taps ĉ(i)s.
2. Using the estimated channel taps ĉ(i)s, from step (1) and using the known transmitted symbols, $$\{s(n)\}_{n=n0}^{n0+L-1},$$

obtain an estimate of the disturbance as follows:

$$\hat{w}(n) = r(n) - \sum_{i=0}^{L-1} \hat{c}(i)s(n-i) \quad n = n0, \ldots, n0 + L - 1 \quad (20)$$

3. Based on w(n) obtained in step (2), estimate the auto-correlation and/or the power spectrum of the disturbance for various lags. Call this estimated auto-correlation at lag τ: $\hat{\rho}_{ww}(\tau)$. This will be a model for the color of the disturbance:

$$\hat{\rho}_{ww}(m) = \frac{1}{N} \sum_{k=1}^{N-m} w(n+k)w^*(k).$$

4. Using the estimated auto-correlation of the disturbance, $\hat{\rho}_{ww}(\tau)$ design a whitening filter for the disturbance (call this whitening filter h(n)). Note that h(n) will be expected to be minimum-phase, and can be made monic with a simple scaling.
5. For an embodiment such as that illustrated in FIG. 2, the signal r(n) is filtered with the whitening filter 220 h(n) to obtain z(n). Next, z(n) is fed to an equalizer 230 which is optimized for white disturbance (e.g. MLSE equalizer with Euclidean metric, decision-feedback sequence estimation (DFSE) equalizer with Euclidean metric, etc). The equalizer 230 provides an estimate of the transmitted symbols s(n)s.
6. For an embodiment such as that illustrated in FIG. 3, the signal r(n) is equalized using an equalizer 330 that is capable of dealing with non-white disturbance. Such an equalizer typically requires knowledge of the color of the disturbance, and this knowledge may be provided to the equalizer 330 based on the model of the disturbance obtained in step (3). An example of such an equalizer is an Eungerbock MLSE equalizer or the modified Euclidian equalizer described above.

The present invention has been described above primarily with reference to MLSE equalizers. However, the present invention is not so limited and may also be applied to other types of equalizers, for example, DFSE equalizers.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method for adaptively whitening a signal disturbance in a communication signal comprising the steps of:
    receiving the communication signal including the signal disturbance from a single antenna;
    determining coefficients for whitening the signal disturbance using known signal information from the received signal; and
    generating a signal estimate for the received signal using the determined coefficients.

2. A method according to claim 1 wherein the communication signal comprises a plurality of signal bursts containing the known signal information and wherein the step of receiving the communication signal comprises the step of receiving one of the plurality of signal bursts to provide the received signal and wherein the steps of receiving, determining and generating are repeated for at least two of the plurality of signal bursts.

3. A method according to claim 2 wherein the step of generating a signal estimate for the received signal using the determined coefficients comprises the steps of:
    processing the received signal through a whitening filter having a selected number of taps associated with the determined coefficients; and
    processing the filtered received signal through an equalizer to generate a signal estimate for the received signal.

4. A method according to claim 3 wherein the step of receiving the communication signal includes the step of downsampling the communication signal to a symbol rate of the communication signal.

5. A method according to claim 4 wherein the step of processing the received signal through a finite impulse-response (FIR) whitening filter having a selected number of taps associated with the determined coefficients further comprises the step of processing the received signal through a whitening filter having M+1 taps, where M is a selected integer, and wherein the determined coefficients are coefficients of the whitening filter which are based on an M-th order linear predictor of the signal disturbance.

6. A method according to claim 5 wherein the step of determining coefficients for whitening the signal disturbance using known signal information from the received signal further comprises the step of determining the coefficients of the whitening filter over a training sequence in the received signal.

7. A method according to claim 5 further comprising the step of adjusting the selected integer value of M based on the received signal.

8. A method according to claim 7 wherein the step of adjusting the selected integer value of M based on the received signal further comprises the step of adjusting the integer value of M based on a change in detected interference power from the received signal so long as the selected integer value of M does not exceed a selected criteria.

9. A method according to claim 3 wherein the step of determining coefficients for whitening the signal disturbance using known signal information from the received signal further comprises the steps of:
    determining a plurality of channel taps of the equalizer;
    determining the signal disturbance based on the determined channel taps and samples of the received signal;
    determining an auto-correlation of the signal disturbance for a plurality of lags; and
    establishing coefficients of the whitening filter based on the determined auto-correlation of the signal disturbance.

10. A method according to claim 9 wherein the whitening filter is a minimum-phase filter.

11. A method according to claim 10 wherein the whitening filter is monic.

12. A method according to claim 11 wherein the equalizer uses a Euclidean metric.

13. A method according to claim 1 wherein the received signal includes the known signal information and wherein the step of generating a signal estimate for the received signal using the determined coefficients comprises the step of:
    processing the received signal through a noise-whitening equalizer to generate a signal estimate for the received signal.

14. A method according to claim 13 wherein the step of processing the received signal through a noise-whitening equalizer is preceded by the step of downsampling the received signal.

15. A method according to claim 13 wherein the step of processing the received signal through a noise-whitening equalizer further comprises the step of modifying metrics of the noise-whitening equalizer to convert the signal disturbance to a substantially white noise signal disturbance.

16. A method according to claim 15 wherein the step of modifying metrics of the noise-whitening equalizer to convert the signal disturbance to a substantially white noise signal disturbance comprises the step of modifying a Euclidean metric equalizer to use metrics defined by the equation $$dM = \left| r(n) - \sum_{i=0}^{L-1} c(i)\hat{s}(n-i) - \hat{w}(n|n-1) \right|^2$$

where r(n) is the received signal at an nth symbol period, c(i) is a channel estimate, $\hat{s}(n-i)$ is a symbol estimate, L is a number of coefficients in the channel estimate, and $\hat{w}(n|n-1)$ is a one-step ahead predictor of the signal disturbance at the nth symbol which is based on the determined coefficients.

17. A method according to claim 15 wherein the step of processing the received signal through a noise-whitening equalizer further comprises the step of maintaining an estimate of the signal disturbance for a plurality of states in a decoding trellis of the noise-whitening equalizer.

18. A method according to claim 13 wherein the step of determining coefficients for whitening the signal disturbance using known signal information from the received signal further comprises the steps of:
    determining a plurality of channel taps of the noise-whitening equalizer;
    determining the signal disturbance based on the determined channel taps and samples of the received signal;
    determining an auto-correlation of the signal disturbance for a plurality of lags to provide a model for the color of the signal disturbance; and
    wherein the step of processing the received signal through a noise-whitening equalizer to generate a signal estimate for the received signal further comprises the step of processing the received signal through a noise-whitening equalizer having coefficients determined based on the model for the color of the signal disturbance to generate a signal estimate for the received signal.

19. A method according to claim 18 wherein the noise-whitening equalizer is an Ungerboeck maximum likelihood sequence estimation (MLSE) equalizer.

20. A method according to claim 13 wherein the step of determining coefficients for whitening the signal disturbance using known signal information from the received signal further comprises the step of updating the determined coefficients based on the signal estimate from the noise-whitening equalizer.

21. A method according to claim 20 wherein the step of updating the determined coefficients based on the signal estimate from the noise-whitening equalizer further comprises the step of treating the signal estimate from the noise-whitening equalizer as known signal information.

22. A single antenna receiver device comprising:
a receiver that receives wireless communication signals including a signal disturbance from a single antenna and downsamples the received signals to a symbol rate of the communication signals to provide received signal samples;
a noise-whitening filter that filters the received signal samples, the noise-whitening filter having filter coefficients;
an equalizer that generates symbol estimates from the filtered received signal samples; and
a filter coefficient estimation circuit that generates the filter coefficients based on known signal information from the received signals.

23. A receiver device according to claim 22 wherein whitening filter has a selected number of taps each tap being associated with one of the filter coefficients.

24. A receiver device according to claim 23 wherein the whitening filter has M+1 taps, where M is a selected integer, and wherein the filter coefficients are based on an M-th order linear predictor of the signal disturbance.

25. A receiver device according to claim 24 wherein the whitening filter is a minimum-phase filter.

26. A receiver device according to claim 25 wherein the whitening filter is monic.

27. A receiver device according to claim 26 wherein the equalizer uses a Euclidean metric.

28. A receiver device comprising:
a receiver that receives wireless communication signals including a signal disturbance and downsamples the received signals to a symbol rate of the communication signals to provide received signal samples;
a noise-whitening equalizer having an associated metric that generate a signal estimate for the received signal; and
a metric circuit that adjusts the metric based on known signal information from the received signals.

29. A receiver device according to claim 28 wherein the metric circuit outputs a model of the signal disturbance to the noise-whitening equalizer and wherein the associated metric is based on the model of the signal disturbance.

30. A receiver device according to claim 29 wherein the associated metric is a modified Euclidean metric defined by the equation $$dM = \left| r(n) - \sum_{i=0}^{L-1} c(i)\hat{s}(n-i) - \hat{w}(n|n-1) \right|^2$$

where c(i) is a channel estimate, ŝ(n−i) is a symbol estimate, L is a number of coefficients in the channel estimate, and ŵ(n|n−1) is a one-step ahead predictor of the signal disturbance at the nth symbol which is based on the model of the signal disturbance.

31. A receiver device according to claim 29 wherein the noise-whitening equalizer is an Ungerboeck maximum likelihood sequence estimation (MLSE) equalizer.

32. A single antenna system for adaptively whitening a signal disturbance in a communication signal comprising:
means for receiving the communication signal including the signal disturbance from a single antenna;
means for determining coefficients for whitening the signal disturbance using known signal information from the received signal; and
means for generating a signal estimate for the received signal using the determined coefficients.

33. A system according to claim 32 wherein the communication signal comprises a plurality of signal bursts containing the known signal information and wherein the means for receiving the communication signal comprises means for receiving one of the plurality of signal bursts to provide the received signal.

34. A system according to claim 33 wherein the means for generating a signal estimate for the received signal using the determined coefficients comprises:
means for processing the received signal through a whitening filter having a selected number of taps associated with the determined coefficients; and
means for processing the filtered received signal through an equalizer to generate a signal estimate for the received signal.

35. A system according to claim 34 wherein the means for receiving the communication signal includes means for downsampling the communication signal to a symbol rate of the communication signal.

36. A system according to claim 35 wherein the means for processing the received signal through a whitening filter having a selected number of taps associated with the determined coefficients further comprises the means for processing the received signal through a whitening filter having M+1 taps, where M is a selected integer, and wherein the determined coefficients are coefficients of the whitening filter which are based on an M-th order linear predictor of the signal disturbance.

37. A system according to claim 36 wherein the means for determining coefficients for whitening the signal disturbance using known signal information from the received signal further comprises means for determining the coefficients of the whitening filter over a training sequence in the received signal.

38. A system according to claim 36 further comprising means for adjusting the selected integer value of M based on the received signal.

39. A system according to claim 34 wherein the means for determining coefficients for whitening the signal disturbance using known signal information from the received signal further comprises:
means for determining a plurality of channel taps of the equalizer;
means for determining the signal disturbance based on the determined channel taps and samples of the received signal;
means for determining an auto-correlation of the signal disturbance for a plurality of lags; and
means for establishing coefficients of the whitening filter based on the determined auto-correlation of the signal disturbance.

40. A system according to claim 39 wherein the whitening filter is a minimum-phase filter.

41. A system according to claim 40 wherein the whitening filter is monic with simple scaling.

42. A system according to claim 41 wherein the equalizer uses a Euclidean metric.

43. A system according to claim 32 wherein the received signal includes the known signal information and wherein the means for generating a signal estimate for the received signal using the determined coefficients comprises means for processing the received signal through a noise-whitening equalizer to generate a signal estimate for the received signal.

44. A system according to claim 43 wherein the means for receiving the communication signal including the signal disturbance further comprises means for downsampling the received signal.

45. A system according to claim 43 wherein the means for processing the received signal through a noise-whitening equalizer further comprises means for modifying metrics of the noise-whitening equalizer to convert the signal disturbance to a substantially white noise signal disturbance.

46. A system according to claim 45 wherein the means for processing the received signal through a noise-whitening equalizer further comprises means for maintaining an estimate of the signal disturbance for a plurality of states in a decoding trellis of the noise-whitening equalizer.

47. A system according to claim 43 wherein the means for determining coefficients for whitening the signal disturbance using known signal information from the received signal further comprises:

means for determining a plurality of channel taps of the noise-whitening equalizer;

means for determining the signal disturbance based on the determined channel taps and samples of the received signal;

means for determining an auto-correlation of the signal disturbance for a plurality of lags to provide a model for the color of the signal disturbance; and wherein the means for processing the received signal through a noise-whitening equalizer to generate a signal estimate for the received signal further comprises means for processing the received signal through a noise-whitening equalizer having coefficients determined based on the model for the color of the signal disturbance to generate a signal estimate for the received signal.

48. A system according to claim 47 wherein the noise-whitening equalizer is an Ungerboeck maximum likelihood sequence estimation (MLSE) equalizer.

49. A system according to claim 43 wherein the means for determining coefficients for whitening the signal disturbance using known signal information from the received signal further comprises means for updating the determined coefficients based on the signal estimate from the noise-whitening equalizer.

50. A system according to claim 49 wherein the means for updating the determined coefficients based on the signal estimate from the noise-whitening equalizer further comprises means for treating the signal estimate from the noise-whitening equalizer as known signal information.

51. A method for adaptively whitening a signal disturbance in a communication signal comprising the steps of:

receiving a signal burst of the communication signal from a single antenna, the signal burst including known signal information, unknown signal information and the signal disturbance;

determining coefficients for whitening the signal disturbance using the known signal information from the received signal burst; and generating a signal estimate for the received signal burst using the determined coefficients.

52. A single antenna receiver device comprising:

a receiver that receives wireless communication signals including a signal disturbance and known signal information and unknown signal information from a single antenna and downsamples the received signals to a symbol rate of the, communication signals to provide received signal samples;

a noise-whitening filter that filters the received signal samples, the noise-whitening filter having filter coefficients;

an equalizer that generates symbol estimates from the filtered received signal samples; and a filter coefficient estimation circuit that generates the filter coefficients based on the known signal information from the received signals.

53. A receiver device comprising:

a receiver that receives wireless communication signals including a signal disturbance, known signal information and unknown signal information and downsamples the received signals to a symbol rate of the communication signals to provide received signal samples;

a noise-whitening equalizer having an associated metric that generate a signal estimate for the received signal; and a metric circuit that adjusts the metric based on the known signal information from the received signals.

54. A single antenna system for adaptively whitening a signal disturbance in a communication signal comprising:

means for receiving a signal burst of the communication signal from a single antenna, the signal burst including known signal information, unknown signal information and the signal disturbance;

means for determining coefficients for whitening the signal disturbance using the known signal information from the received signal burst; and means for generating a signal estimate for the received signal burst using the determined coefficients.

* * * * *